United States Patent
Kobayashi (10) Patent No.: US 8,917,429 B2
(45) Date of Patent: Dec. 23, 2014

(54) DOCUMENT ILLUMINATION DEVICE, CONTACT-TYPE IMAGE SENSOR MODULE, AND IMAGE READING DEVICE

(71) Applicant: Seiko Epson Corporation, Tokyo (JP)

(72) Inventor: Hidekazu Kobayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/100,234

(22) Filed: Dec. 9, 2013

(65) Prior Publication Data

US 2014/0168724 A1    Jun. 19, 2014

(30) Foreign Application Priority Data

Dec. 18, 2012    (JP) ................. 2012-275403

(51) Int. Cl.
*H04N 1/04*    (2006.01)
*H04N 1/40*    (2006.01)
*H04N 1/028*    (2006.01)
*H04N 1/031*    (2006.01)

(52) U.S. Cl.
CPC ....... *H04N 1/40056* (2013.01); *H04N 1/02835* (2013.01); *H04N 1/0289* (2013.01); *H04N 1/0318* (2013.01); *H04N 2201/0081* (2013.01); *H04N 2201/03112* (2013.01); *H04N 2201/03125* (2013.01); *H04N 2201/03141* (2013.01); *H04N 2201/03145* (2013.01)
USPC ........ 358/475; 358/482; 382/275; 348/222.1; 399/218

(58) Field of Classification Search
CPC ....... F21V 33/0052; F21V 5/002; F21V 9/08; F21V 9/12; H04N 13/02; H04N 1/00029; H04N 1/00045; H04N 5/232; H04N 5/23206; H04N 5/445

USPC ........ 358/475, 509, 474, 406, 482, 497, 496; 382/275, 167, 128, 141; 348/143, 148, 348/207.11, 222.1, 280, 46, 564; 399/301, 399/218

See application file for complete search history.

(56) References Cited

U.S. PATENT DOCUMENTS

| | | | | |
|---|---|---|---|---|
| 4,729,018 A | * | 3/1988 | Watanabe et al. | 348/69 |
| 5,166,999 A | * | 11/1992 | Rees et al. | 385/120 |
| 5,471,343 A | * | 11/1995 | Takasugi | 359/489.16 |
| 5,897,488 A | * | 4/1999 | Ueda | 600/143 |
| 6,232,592 B1 | * | 5/2001 | Sugiyama | 250/227.11 |
| 6,295,077 B1 | * | 9/2001 | Suzuki | 347/237 |
| 6,819,352 B2 | * | 11/2004 | Mizes et al. | 347/240 |
| 6,897,982 B1 | * | 5/2005 | Ashida et al. | 358/3.09 |
| 8,207,994 B2 | * | 6/2012 | Ohno | 347/238 |
| 8,345,074 B2 | * | 1/2013 | Okazaki | 347/130 |
| 8,411,124 B2 | * | 4/2013 | Kinoshita et al. | 347/247 |
| 8,600,283 B2 | * | 12/2013 | Kinoshita et al. | 399/395 |

FOREIGN PATENT DOCUMENTS

JP    2000-214305    8/2000

* cited by examiner

*Primary Examiner* — Negussie Worku (57) ABSTRACT

A document illumination device includes a light-conducting member in which is formed a base surface that extends along a lengthwise direction, an irradiation surface that extends along the lengthwise direction and is tilted in the widthwise direction relative to the base surface, and a side surface that extends in the lengthwise direction and connects the base surface to the irradiation surface; a scattering member that is provided opposing the base surface and the side surface and that scatters light emitted from the base surface and the side surface; and a light source provided opposing a lengthwise direction-end surface of the light-conducting member.

8 Claims, 9 Drawing Sheets

FIRST EMBODIMENT

FIG. 4
SECOND EMBODIMENT

DOCUMENT ILLUMINATION DEVICE, CONTACT-TYPE IMAGE SENSOR MODULE, AND IMAGE READING DEVICE

CROSS REFERENCE TO RELATED APPLICATION

The entire disclosure of Japanese Patent Application No. 2012-275403, filed Dec. 18, 2012 is expressly incorporated by reference herein.

BACKGROUND

1. Technical Field

The present invention relates to document illumination devices, contact-type image sensor modules, and image reading devices.

2. Related Art

Contact-type image sensor modules have been widely used in image reading devices such as image scanners, facsimile devices, and so on for some time. With a contact-type image sensor module, an image sensor whose width is greater than or equal to the width of a document to be read is disposed in close proximity to the document, and an imaging optical device that forms an erect unmagnified image is disposed between the document and the image sensor. For the imaging optical device, it is common to use a lens array in which many graded index lenses are arranged.

In recent years, attempts have been made to reduce the cost of manufacturing such imaging optical devices by using a combination of a lens member in which many curved-surface lenses are formed and a light-blocking member in which many through-holes are formed in correspondence with the individual curved-surface lenses, instead of a graded index lens (for example, see JP-A-2000-214305). Generally speaking, such a lens member, in which curved-surface lenses are formed, is several times thicker than a graded index lens (that is, the lens radii are greater).

In the case where a contact-type image sensor module is used in the image reading device, the document illumination device is disposed extremely close to the lens member and a region where the surface of the document intersects with the optical axes of the lenses is illuminated. Such a document illumination device includes a rod-shaped light-conducting member that is longer in the direction in which the lens array is arranged and a light source disposed near an end surface of the light-conducting member in the lengthwise direction thereof.

However, a lens member in which curved-surface lenses are formed is several times thicker than a graded index lens, and thus there is a long distance between the optical axes of the lenses and the light-conducting member; as a result, there is a problem in that the region of the document to be scanned becomes dark.

SUMMARY

It is an advantage of some aspects of the invention to increase the irradiance in a reading region of a document illumination device.

A document illumination device according to an aspect of the invention includes a light-conducting member in which is formed a base surface that extends along a lengthwise direction, an irradiation surface that extends along the lengthwise direction and is tilted in the widthwise direction relative to the base surface, and a side surface that extends in the lengthwise direction and connects the base surface to the irradiation surface; a scattering member that is provided opposing the base surface and the side surface and that scatters light emitted from the base surface and the side surface; and a light source provided opposing a lengthwise direction-end surface of the light-conducting member.

According to this aspect of the invention, light from the light source that is incident on the light-conducting member is scattered by the scattering member upon being emitted from the base surface and the side surface of the light-conducting member, and is then incident on the irradiation surface. The irradiation surface is not parallel to the base surface in the widthwise direction, and thus a primary component of the light scattered by the scattering member is refracted in the widthwise direction of the light-conducting member by the irradiation surface. Through this, under specific conditions, the light-conducting member can emit the primary component of the light onto a "region that is further" in the direction in which the base surface of the light-conducting member faces, or in other words, in a direction perpendicular to the base surface.

Here, the "region that is further" will be described using FIG. 1. Based on Snell's law, at a point of intersection b between an irradiation surface $p_2$ and a given light flux that advances in a direction perpendicular to a base surface $p_1$ of the light-conducting member, light emitted into the air from a light-conducting member is emitted tilted toward the irradiation surface due to the difference between the refractive index of the light-conducting member (for example, 1.5) and the refractive index of air.

Accordingly, if an isosceles triangle bcd having the point of intersection b as its apex, a side bc that is a line segment extending at a given length from a light flux ab, and a side bd that is the same length as the side bc and is a line segment parallel to a light flux resulting from the light flux ab being refracted is defined along with a plane $p_3$ that passes through an apex d and intersects with the side bc, then bd>bc. In other words, if the plane $p_3$ is taken as the surface of a document, a given light flux that advances in a direction perpendicular to the base surface $p_1$ of the light-conducting member irradiates a region that is further from the point of intersection b with the irradiation surface $p_2$ than in the case where the irradiation surface $p_2$ is parallel to the base surface $p_1$. Accordingly, in the case where the document illumination device according to the invention is positioned relative to the document surface under such conditions, the document illumination device can be disposed in a position further from a target document region without reducing the irradiance. Furthermore, assuming that a thickness T of the light-conducting member is the same, the surface area of the irradiation surface $p_2$ can be made greater than in the case where the irradiation surface $p_2$ is parallel to the base surface $p_1$, and thus the invention can also increase the optical usage efficiency. In other words, according to the invention, the irradiance at a reading region can be increased under a condition where it is necessary to dispose the document illumination device in a position that is far from the reading region.

According to another aspect of the invention, in the document illumination device, the side surface may have a projecting portion, and the scattering member may be provided further toward the base surface than the projecting portion.

By employing this configuration, light can be suppressed from leaking from a gap between the scattering member and the light-conducting member. Accordingly, the reading region can be uniformly illuminated by the document illumination device.

A contact-type image sensor module according to another aspect of the invention includes a linear image sensor having a light-receiving surface that extends in the lengthwise direction of the light-conducting member; the aforementioned document illumination device; and a lens member, provided along the document illumination device, whose optical axis intersects with a perpendicular of the base surface of the document illumination device and that forms an erect unmagnified image on the light-receiving surface of the linear image sensor.

According to this aspect of the invention, an image of the document illuminated by the aforementioned document illumination device can be formed on the linear image sensor. Furthermore, a bright document image can be formed on the linear image sensor even if there is a great distance between the document illumination device and the optical axis of the lens member.

In the case where a document positioned using a positioning member such as a platen glass is to be read, the positioning member is provided between the contact-type image sensor module and the document so as to be perpendicular to the optical axis of the lens member. When the light emitted from the irradiation surface of the light-conducting member is repeatedly reflected between the positioning member and the irradiation surface, ghosts are formed on the light-receiving surface of the linear image sensor. Generally speaking, the positioning is such that the optical axis of the lens member is perpendicular to the document surface. If the optical axis of the lens member and the irradiation surface of the light-conducting member are perpendicular to each other, the document surface and the irradiation surface will be parallel to each other.

Accordingly, in the contact-type image sensor module according to this aspect of the invention, the configuration may be such that the irradiation surface is not perpendicular to the optical axis of the lens member.

In the case where this configuration is employed, multipass reflection between the positioning member and the irradiation surface can be suppressed, and thus ghosts formed on the light-receiving surface of the linear image sensor can be suppressed as well.

In the contact-type image sensor module according to another aspect of the invention, the irradiation surface may face the optical axis of the lens member.

Figure 1:
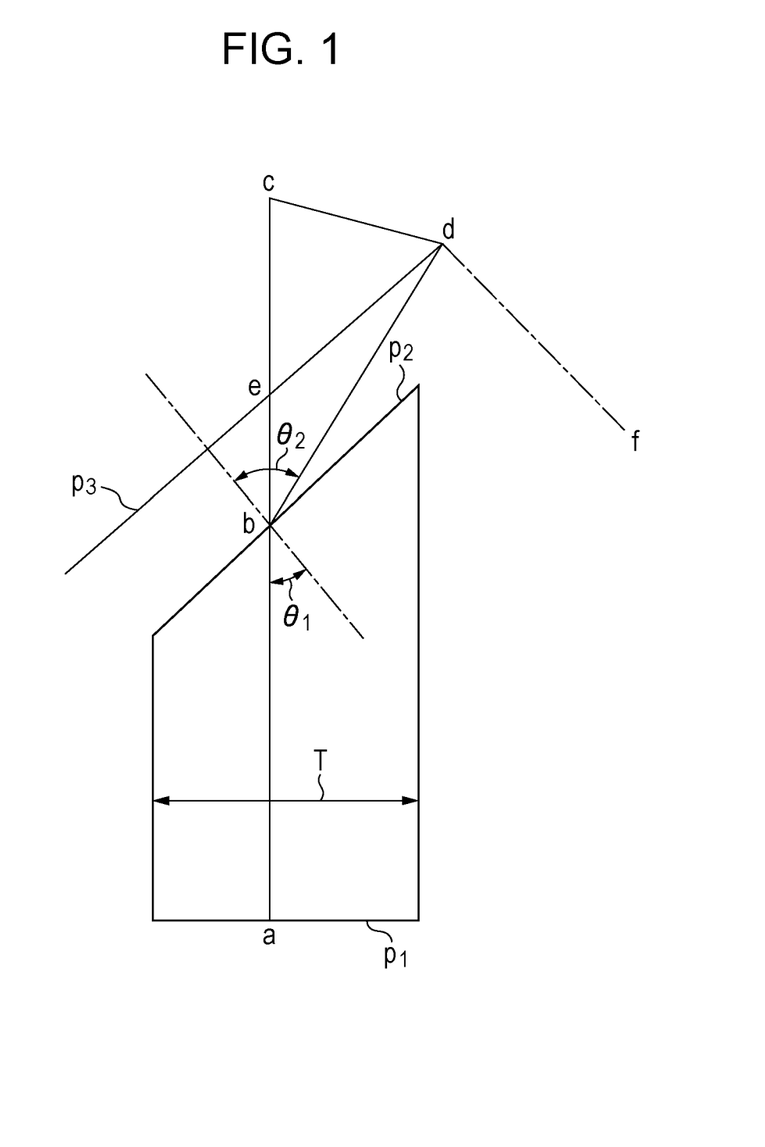
FIG. 1 is an optical path diagram illustrating a principle of the invention.

Assuming that the plane $p_3$ shown in FIG. 1 is parallel to the irradiation surface $p_2$, the irradiation surface facing the optical axis of the lens member refers to a state in which the irradiation surface $p_2$ is further to the upper-left than the orientation shown in FIG. 1. If the light-conducting member is positioned or the irradiation surface $p_2$ is set in this state, a more distant region can be illuminated while suppressing ghosting than in the case where the light-conducting member is positioned in a state where the irradiation surface $p_2$ is not facing an optical axis df of the lens member (that is, the state shown in FIG. 1).

In the contact-type image sensor module according to another aspect of the invention, the irradiation surface may refract light emitted from the irradiation surface toward the optical axis of the lens member.

An image reading device according to another aspect of the invention includes the aforementioned contact-type image sensor module and a positioning member that positions the document relative to the document illumination device and the lens member.

According to the invention, a document can be read at a high level of brightness.

The image reading device according to another aspect of the invention further includes a light-transmissive placement member upon which a document is placed, and an angle formed between the placement member and the base surface is greater than an angle formed between the placement member and the irradiation surface.

In the document illumination device according to another aspect of the invention, the irradiation surface refracts light so that an angle formed between a line perpendicular to the irradiation surface and the light emitted from the irradiation surface is greater than an angle formed between the line perpendicular to the irradiation surface and light traveling toward the irradiation surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described hereinafter with reference to the appended drawings. Note that in the drawings, like constituent elements are given the same reference numerals, and redundant descriptions thereof are omitted.

First Embodiment

Figure 2A:
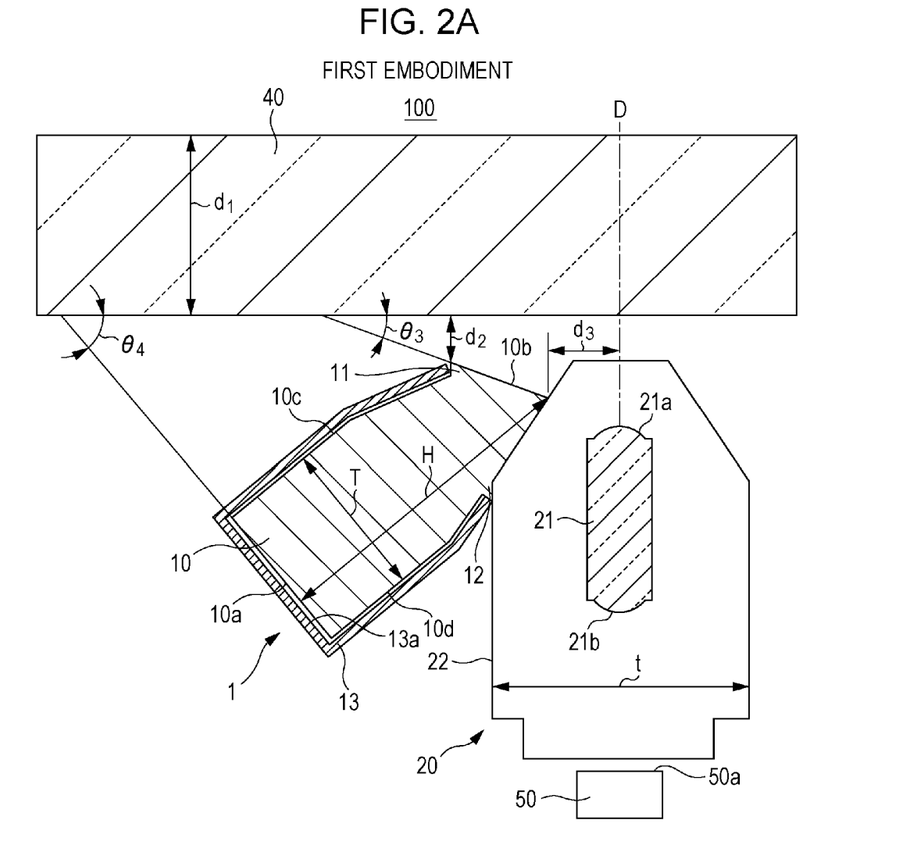
FIG. 2A is a cross-sectional view illustrating an embodiment of the invention.
Figure 2B:
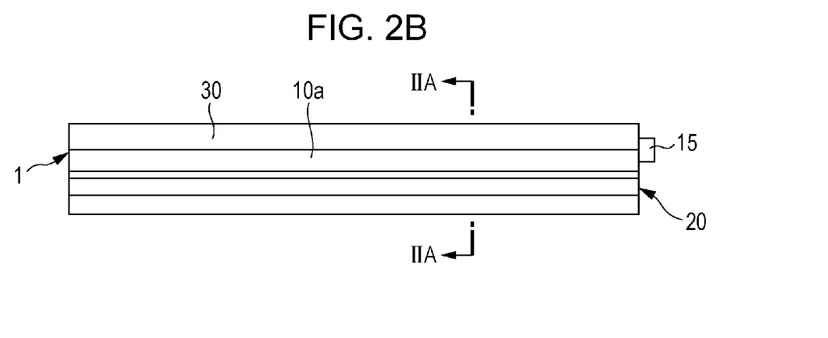
FIG. 2B is a plan view illustrating the embodiment of the invention.

FIGS. 2A and 2B illustrate the configuration of an image reading device according to a first embodiment of the invention. FIG. 2A corresponds to a cross-sectional view taken along the IIA-IIA line shown in FIG. 2B. This image reading device 100 includes a contact-type image sensor module having a document illumination device 1, an imaging optical device 20, and a linear image sensor 50; a platen glass 40; and an analog-digital converter, a sub-scanning mechanism, a control unit, and the like (not shown).

The platen glass 40, which serves as a positioning member, is a transparent plate-shaped member for positioning a document (not shown), which serves as a target object, relative to the imaging optical device 20.

The linear image sensor 50, the imaging optical device 20, and the document illumination device 1 have their relative positional relationships fixed by an opaque housing (not shown) that moves parallel to the platen glass 40. The imaging optical device 20 is provided between the platen glass 40 and the linear image sensor 50 so as to form an erect unmagnified image on a light-receiving surface 50a of the linear image sensor 50.

The linear image sensor 50, which serves as an image sensor, has the light-receiving surface 50a, which opposes the platen glass 40 while being parallel to the platen glass 40. A plurality of photoelectric conversion elements (not shown) are arranged in the light-receiving surface 50a along a main scanning direction.

The imaging optical device 20 includes a lens member 21 and a light-blocking member (not shown). The lens member 21 is a transparent glass member in which a plurality of lens surfaces 21a and 21b are disposed in a straight line on respective opposing end surfaces of the lens member 21. A lens positioning member 22 fixes the lens member 21 and the light-blocking member in an orientation in which the optical axes of the lens surfaces 21a and 21b are perpendicular to the platen glass 40. The platen glass 40-side end surface and the linear image sensor 50-side end surface of the lens member 21 have the same shape. In other words, the platen glass 40-side lens surfaces 21a in the lens member 21 and the linear image sensor 50-side lens surfaces 21b in the lens member 21 have the same shape, and the lens surfaces 21a and 21b are disposed in the same manner in their respective end surfaces as well. A plurality of apertures through which the optical axes of the lens surfaces 21a and 21b pass are formed in the light-blocking member along the main scanning direction.

The document illumination device 1 is provided in close proximity to the imaging optical device 20. The document illumination device 1 includes a light-conducting member 10, a scattering member 13, and a light source 15.

The light-conducting member 10 is a transparent member configured of an acrylic resin (PMMA) in long bar shape that follows the main scanning direction. A resin aside from an acryl, such as COP or COC, may be used as the material of the light-conducting member 10, and glass may be used as well. Of the surfaces of the light-conducting member 10 that extend in the lengthwise direction, a flat surface opposed to the platen glass 40 in close proximity thereto serves as an irradiation surface 10b. A flat surface on the opposite side as the irradiation surface 10b serves as a base surface 10a. Side surfaces 10c and 10d are formed on both sides between the irradiation surface 10b and the base surface 10a.

The base surface 10a of the light-conducting member 10 is tilted at an orientation so that the perpendicular thereof intersects with the optical axis of the lens member 21 on the platen glass 40-side. In other words, the light-conducting member 10 is positioned relative to the lens member 21 in a tilted orientation so that light advancing perpendicularly from the base surface 10a toward the irradiation surface 10b approaches the optical axis of the lens member 21. An optimal angle for an angle $\theta_4$ formed between the base surface 10a and the platen glass 40 is determined by the distance from the optical axis of the lens member 21 to the light-conducting member 10, the refractive index of the light-conducting member 10, an angle of slope $\theta_3$ of the irradiation surface 10b, and so on; as $\theta_4$ increases, document regions that are further from the light-conducting member 10 in a direction parallel to the platen glass 40 can be illuminated. In this embodiment, the imaging optical device 20 has a thickness t of 4 mm, and the $\theta_4$ is 50°.

The irradiation surface 10b of the light-conducting member 10 is not parallel to the base surface 10a. The irradiation surface 10b is tilted relative to the platen glass 40 in the same direction as the base surface 10a. In other words, a side of the irradiation surface 10b that is closer to the optical axis of the lens member 21 is further from the platen glass 40 and a side of the irradiation surface 10b that is further from the optical axis of the lens member 21 is closer to the platen glass 40. An optimal angle for the angle $\theta_3$ formed between the irradiation surface 10b and the platen glass 40 is determined by the distance from the optical axis of the lens member 21 to the light-conducting member 10, the refractive index of the light-conducting member 10, the angle of slope $\theta_4$ of the base surface 10a, and so on; here, it is preferable for the relationship $0°<\theta_3<\theta_4$ to hold true. As $\theta_3$ approaches 0°, or in other words, as the irradiation surface 10b and the platen glass 40 approach being parallel, it becomes easy for multipass reflection to arise between the irradiation surface 10b and the platen glass 40. This multipass reflection can be effectively suppressed by setting $\theta_3$ to be greater than or equal to 10°. On the other hand, as the angle formed between the base surface 10a and the irradiation surface 10b ($\theta_4$-$\theta_3$) increases, the irradiation surface 10b can be widened and document regions that are further from the light-conducting member 10 in the direction parallel to the platen glass 40 can be illuminated due to the refractive effect of the irradiation surface 10b. In this embodiment, $\theta_3$=20°.

A projection portion 12 is formed in the side surface 10d of the light-conducting member 10. Meanwhile, the side surface 10d bends at an intermediate location on the irradiation surface 10b-side so as to approach the side surface 10c. A flat area of the side surface 10d on the irradiation surface 10b-side is in tight contact with the positioning member 22 of the imaging optical device 20 at a region extending to the projection portion 12. Through this, the irradiation surface 10b of the light-conducting member 10 can be brought close to the optical axis of the lens member 21.

Meanwhile, the side surface 10c of the light-conducting member 10 bends at an intermediate location on the irradiation surface 10b-side so as to approach the side surface 10d. A projection portion 11 is formed in the edge of the side surface 10c on the irradiation surface 10b-side thereof. The projection portion 11 is adjacent to the housing (not shown).

A light-scattering structure for uniformly reflecting and distributing incident light from the light source 15 in the lengthwise direction is built into the base surface 10a of the light-conducting member 10. This structure is configured by, for example, using a white compound to print a pattern that is smaller on the side where light from the light source 15 is incident and becomes progressively larger as the pattern moves away from the light source 15-side, or disposing crescent-shaped grooves in the base surface 10a at a pitch that decreases progressively from the side where light from the light source 15 is incident, keeping the same pitch between the crescent-shaped grooves but increasing the sag amount of the grooves as the base side 10a progresses from the side where light from the light source 15 is incident, or the like. It is desirable for the pitch of the printed pattern, the grooves, or the like to be 1 to 3 mm. A greater pitch will result in a non-uniform state of illumination, whereas a smaller pitch makes it difficult to form the pattern. Any other form that achieves the same effect can be applied instead of the white pattern and the grooves mentioned here. The side surfaces 10c and 10d of the light-conducting member 10 are surfaces that are slightly bent progressing toward the light-irradiation side, and thus the light scattered by the base surface 10a can be efficiently conducted to the irradiation surface 10b.

The scattering member 13 is a sheet-shaped member having a highly-reflective scattering surface 13a, and is disposed between the housing (not shown) and the light-conducting member 10. The scattering member 13 wraps around the light-conducting member 10 from the side surface 10c, over the base surface 10a, and to the side surface 10d, with the scattering surface 13a opposed at a short distance from the side surface 10c, the base surface 10a, and the side surface 10d of the light-conducting member 10. An end area of a gap between the scattering surface 13a and the side surface 10c of the light-conducting member 10, on the platen glass 40-side of the gap, is closed by the projection portion 11. This prevents light from leaking toward the platen glass 40 from the gap between the side surface 10c of the light-conducting member 10 and the scattering member 13. An end area of a gap between the scattering surface 13a and the side surface 10d of the light-conducting member 10, on the platen glass 40-side of the gap, is closed by the projection portion 12. This prevents light from leaking toward the platen glass 40 from a gap between the side surface 10d of the light-conducting member 10 and the positioning member 22. Furthermore, the entire side surface 10d of the light-conducting member 10 is not covered by the scattering member 13, and thus the light-conducting member 10 can be brought into close contact with the positioning member 22, bringing the light-conducting member 10 closer to the optical axis of the lens member 21.

Meanwhile, the scattering surface 13a is bent so as to run parallel to the side surface 10c of the light-conducting member 10, and thus a primary component of light exiting a region from the bend of the side surface 10c in the light-conducting member 10 to the projection portion 11 is scattered by the scattering surface 13a, being once again incident on the side surface 10c of the light-conducting member 10 in a direction approaching the base surface 10a of the light-conducting member 10. Likewise, the scattering surface 13a is bent so as to run parallel to the side surface 10d of the light-conducting member 10, and thus a primary component of light exiting a region from the bend of the side surface 10d in the light-conducting member 10 to the projection portion 12 is scattered by the scattering surface 13a, being once again incident on the side surface 10d of the light-conducting member 10 in a direction approaching the base surface 10a of the light-conducting member 10.

As shown in FIG. 2B, the light source 15 opposes an end area of the light-conducting member 10 in the main scanning direction, or in other words, an end area in the lengthwise direction thereof. The light source 15 includes an LED that emits light toward the end area of the light-conducting member 10 in the lengthwise direction thereof.

The light emitted from the light source 15 is incident on one end area of the light-conducting member 10 in the lengthwise direction and advances toward the other end of the light-conducting member 10. The light incident on the base surface 10a of the light-conducting member 10 is reflected and scattered toward the light irradiation surface 10b by the white pattern or the groove structure.

Figure 3:
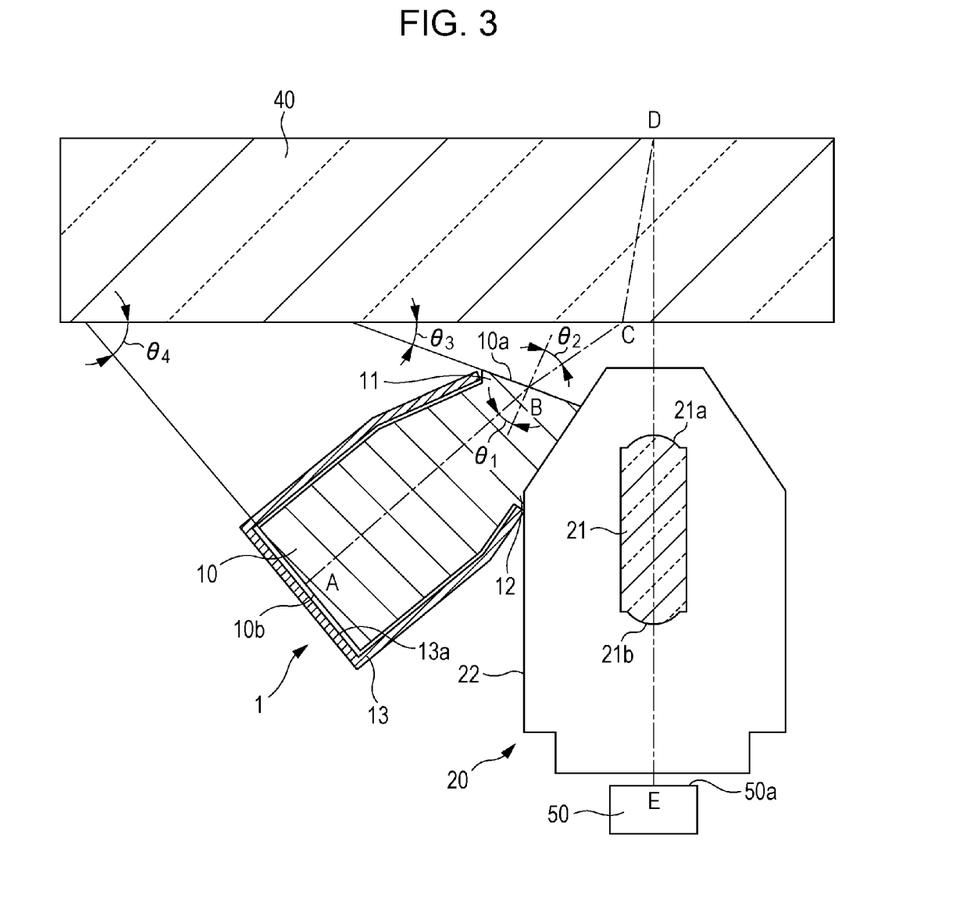
FIG. 3 is an optical path diagram illustrating an embodiment of the invention.

As shown in FIG. 3, a primary component of the light incident on the light-conducting member 10 from the base surface 10a advances in a direction perpendicular to the base surface 10a, is refracted by the irradiation surface 10b, and advances toward the platen glass 40. The absolute refractive index of the light-conducting member 10 is greater than the absolute refractive index of air, and thus a refraction angle $\theta_2$ at the irradiation surface 10b is greater than an incidence angle $\theta_1$. Accordingly, a light flux AB perpendicular to the base surface 10a of the light-conducting member 10 is incident on the platen glass 40 at a point C, which is closer to an optical axis DE of the lens member 21 than a point at which a line extending from the light flux AB intersects with a base surface of the platen glass 40. In other words, in this case, the primary component of the light emitted from the irradiation surface 10b of the light-conducting member 10 illuminates a document region D that is further in the direction parallel to the platen glass 40 from the light-conducting member 10, than in the case where the irradiation surface 10b is parallel to the base surface 10a. Speaking in terms of a relationship between the lens member 21 and the optical axis DE, in this case, the primary component of the light emitted from the irradiation surface 10b of the light-conducting member 10 illuminates the document region D closer to the optical axis DE than in the case where the irradiation surface 10b is parallel to the base surface 10a.

Second Embodiment

Figure 4:
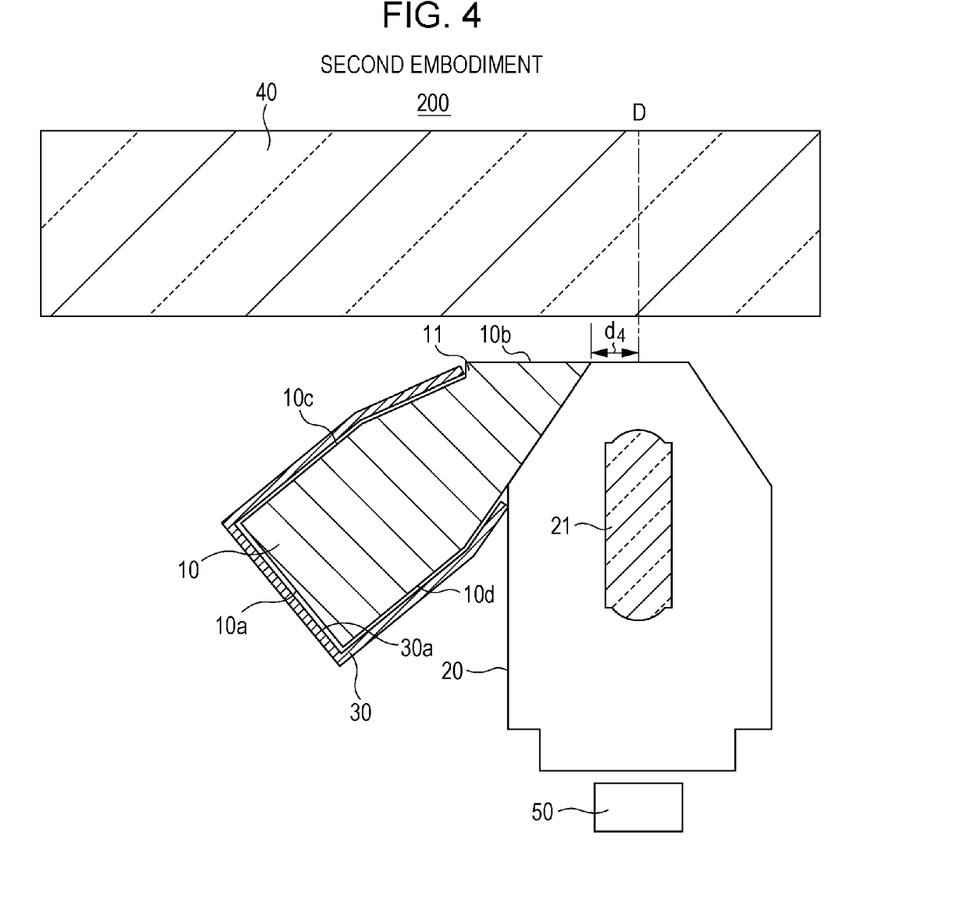
FIG. 4 is a cross-sectional view illustrating an embodiment of the invention.

FIG. 4 illustrates the configuration of an image reading device 200 according to a second embodiment of the invention. The second embodiment differs from the first embodiment only in that the irradiation surface 10b of the light-conducting member 10 is parallel to the platen glass 40 and a projection portion that covers a gap between the light-conducting member 10 and a scattering member 30 is not formed in the side surface 10d on the lens member 21-side of the light-conducting member 10.

Comparison between Comparative Example and Embodiments

Figure 5:
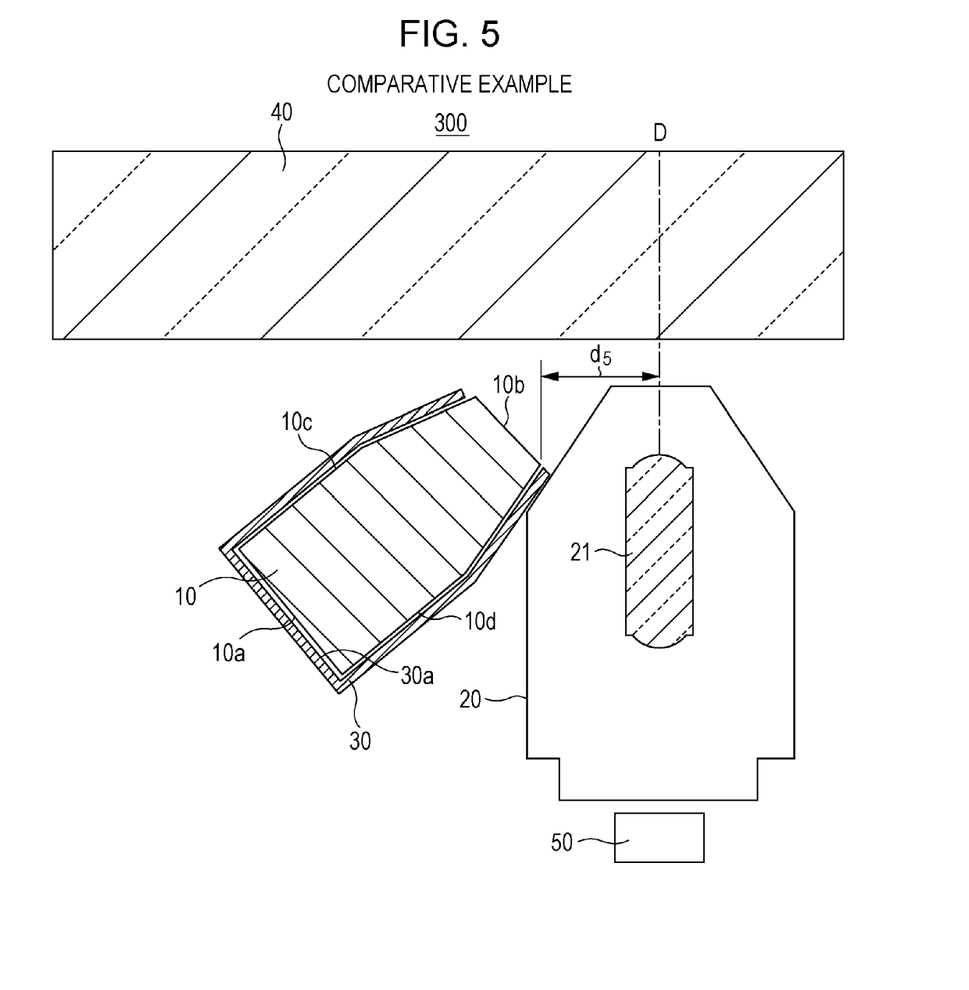
FIG. 5 is a cross-sectional view illustrating an embodiment of the invention.

FIG. 5 illustrates an image reading device 300 serving as a comparative example. The comparative example differs from the first embodiment only in that the irradiation surface 10b of the light-conducting member 10 is parallel to the base surface 10a and a projection portion that covers a gap between the light-conducting member 10 and the scattering member 30 is formed in neither of the side surfaces 10c and 10d of the light-conducting member 10.

Hereinafter, effects of the embodiments will be described based on the effects of simulating the irradiance at the region where the optical axis of the lens member 21 intersects with the document surface for the embodiments and the comparative example using Light Tools®. Values for the simulation settings are as indicated below (see FIGS. 2A, 2B, 4, and 5 for reference numerals indicating dimensions).

Figure 6:
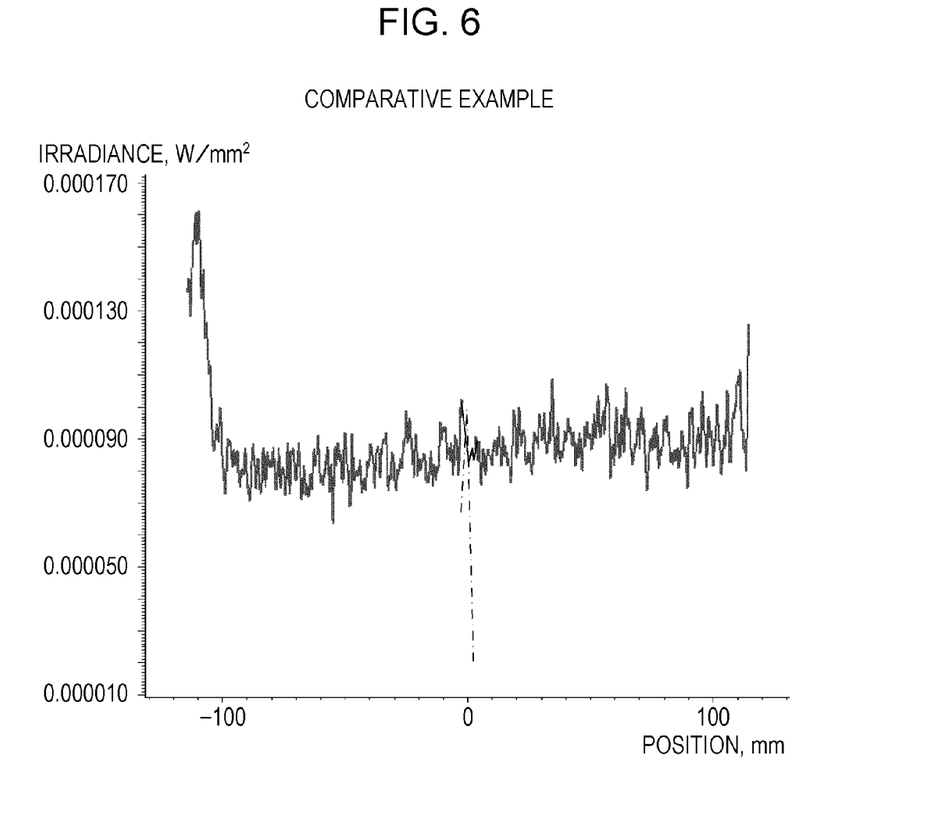
FIG. 6 is a polygonal line graph according to an embodiment of the invention.
Figure 7:
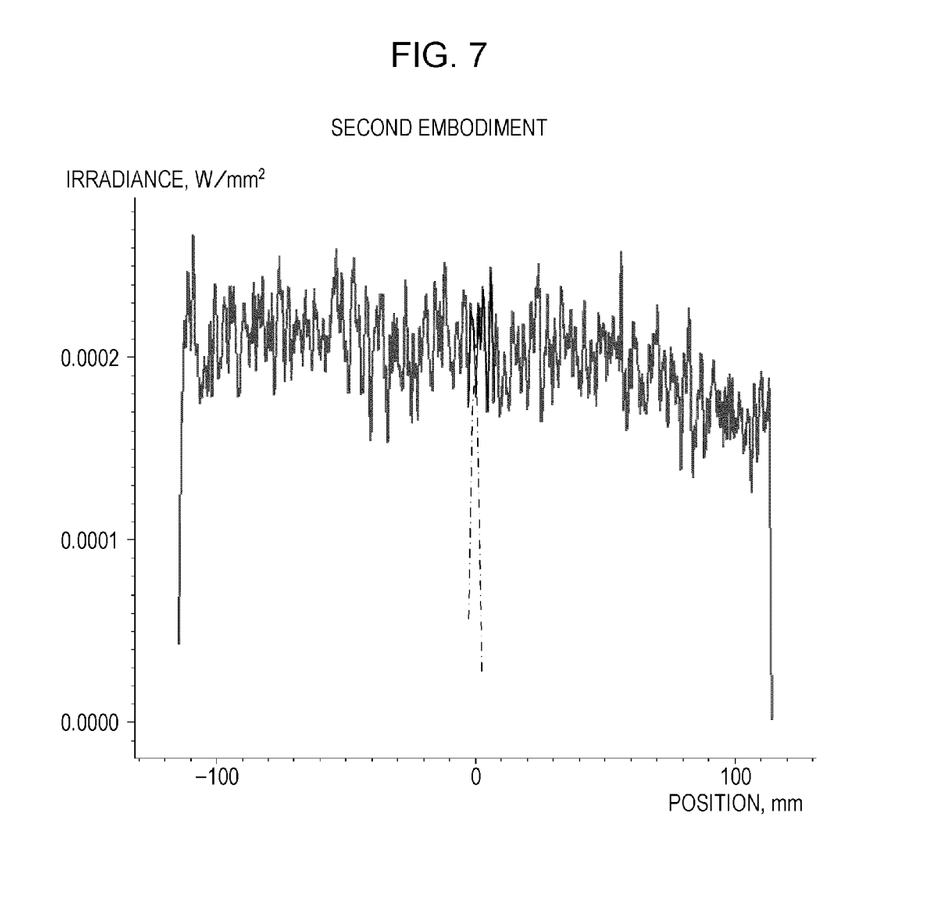
FIG. 7 is a polygonal line graph according to an embodiment of the invention.

Thickness T of light-conducting member 10: 2 mm
Height H of light-conducting member 10: 4 mm
Absolute refractive index of light-conducting member 10: 1.52
Thickness $d_1$ of platen glass 40: 2.8 mm
Absolute refractive index of platen glass 40: 1.52
Distance $d_3$ from light-conducting member 10 to platen glass 40 in first embodiment: 0.66 mm
Distance $d_4$ from light-conducting member 10 to platen glass 40 in second embodiment: 0.66 mm
Distance $d_5$ from light-conducting member 10 to platen glass 40 in comparative example: 0.66 mm FIG. 6 illustrates simulation results for the comparative example, and FIG. 7 illustrates simulation results for the second embodiment. In FIGS. 6 and 7, the solid line indicates the irradiance at each location on the optical axis of the lens member, with the horizontal axis representing a positional change in the main scanning direction, whereas the dot-dash line indicates the irradiance at a center position in the main scanning direction, with the horizontal axis representing a positional change in the sub scanning direction.

As shown in FIG. 6, in the comparative example, the irradiance spikes at the end regions in the main scanning direction. This is because there are no projection portions in the side surfaces 10c and 10d of the light-conducting member 10, and thus some of the light emitted from the light source 15 passes through the gap between the light-conducting member 10 and the scattering member 30 and reaches the document surface rather than striking the light-conducting member 10. As opposed to this, as shown in FIG. 7, the second embodiment obtains an almost uniform irradiance across the entire main scanning direction, and the irradiance is higher than in the comparative example. In terms of the usage efficiency of the light emitted from the light source 15, the comparative example provides 7.4%, whereas the second embodiment provides 17%. This discrepancy arises because the projection portion 11 is formed in the side surface 10c of the light-conducting member 10 in the second embodiment, and thus light does not leak from the gap between the side surface 10c of the light-conducting member 10 and the scattering member 30. Although the projection portion is not formed in the side surface 10d of the light-conducting member 10 in the second embodiment, if the gap between the side surface 10d of the light-conducting member 10 and the scattering member 30 is covered by the positioning member 22, an almost uniform irradiance can be obtained across the entire main scanning direction, as can be seen here.

Furthermore, as shown in FIG. 6, in the comparative example, the irradiance at the center in the main scanning direction is lower than a maximum value of the irradiance in the sub scanning direction. This is because the document region at the optical axis of the lens member 21 darkens due to the document region that is closer to the light-conducting member 10 being more brightly illuminated than the document region at the optical axis of the lens member 21. As opposed to this, as shown in FIG. 7, in the second embodiment, the irradiance at the center in the main scanning direction is the same as the maximum value of the irradiance in the sub scanning direction. Accordingly, it can be seen that a document region that is further from the light-conducting member 10 than in the comparative example can be illuminated by tilting the irradiation surface 10b relative to the base surface 10a of the light-conducting member 10.

Figure 8:
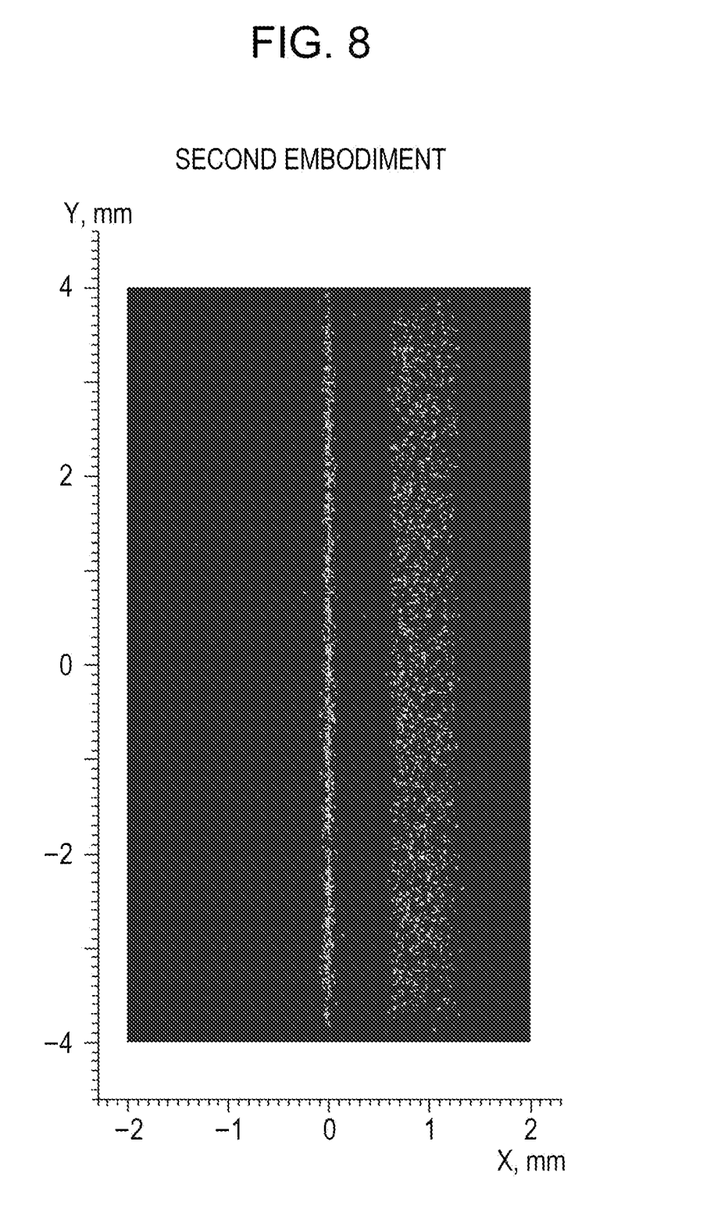
FIG. 8 is a diagram illustrating an image according to an embodiment of the invention.
Figure 9:
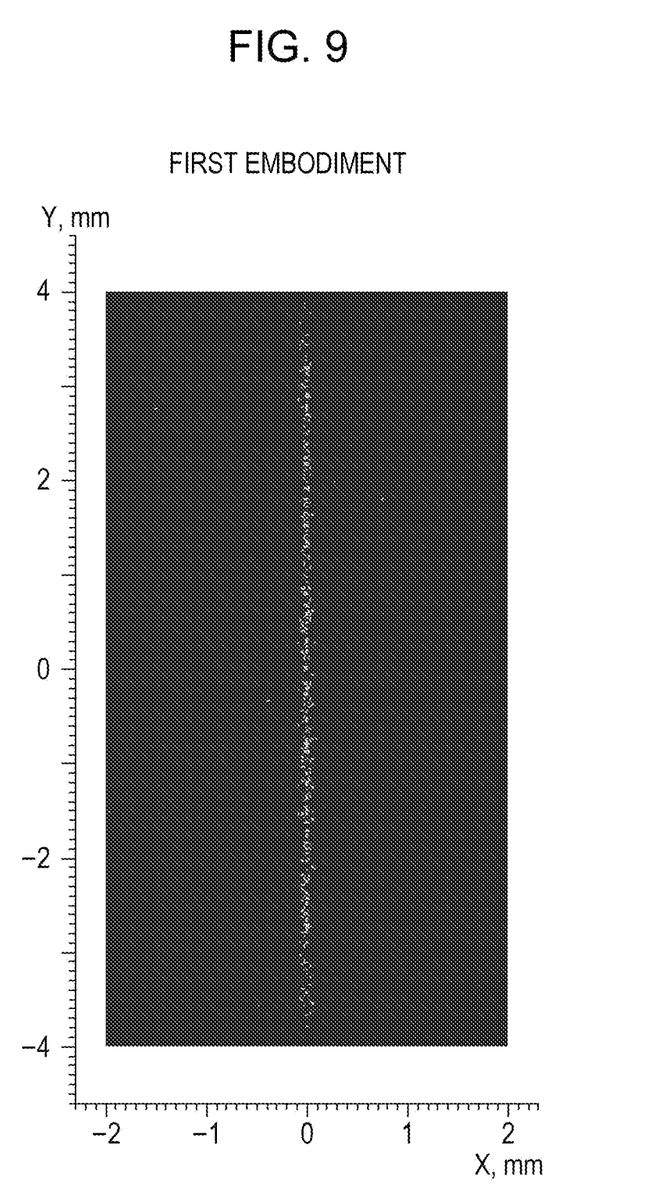
FIG. 9 is a diagram illustrating an image according to an embodiment of the invention.

Next, descriptions will be given of a simulation result in which a document is placed on the top surface of the platen glass 40 and an image of the document is formed on a flat surface of the linear image sensor 50, including a light-receiving surface thereof. White line segments extending in the main scanning direction are formed over a black background on the document surface. FIG. 8 illustrates an image obtained by outputting a simulation result of the second embodiment as a two-dimensional image, whereas FIG. 9 illustrates an image obtained by outputting a simulation result of the first embodiment as a two-dimensional image. As shown in FIG. 8, in the second embodiment, ghosting arises due to the irradiation surface 10b of the light-conducting member 10 being parallel to the platen glass 40. However, as shown in FIG. 9, the first embodiment suppresses ghosting. From this, it can be seen that ghosting caused by multipass reflection between the irradiation surface 10b and the platen glass 40 can be suppressed by ensuring that the irradiation surface 10b of the light-conducting member 10 is not parallel to the platen glass 40.

Other Embodiments

Note that the technical scope of the invention is not intended to be limited to the aforementioned embodiments, and it goes without saying that various changes can be made within a scope that does not depart from the essential spirit of the invention. For example, the materials, dimensions, and so on indicated in the aforementioned embodiments are merely examples, and descriptions of the addition, removal, or replacement of constituent elements which will be clear to one skilled in the art have been omitted.

Specifically, a graded index lens array, for example, may be used as the imaging optical device 20. Furthermore, an element aside from an LED may be used as the light source 15. The side surfaces 10c and 10d of the light-conducting member 10 may each be configured of individual flat surfaces, or may be configured of curved surfaces. In the case where the side surfaces 10c and 10d of the light-conducting member 10 are each configured of individual flat surfaces, the side surfaces 10c and 10d may be parallel to each other, or may approach each other as the side surfaces 10c and 10d progress toward the irradiation surface 10b. In addition, the thickness T of the light-conducting member 10 may be constant along the lengthwise direction, or may become thinner as the light-conducting member 10 moves away from the light source 15, or may become thicker as the light-conducting member 10 moves away from the light source 15. Furthermore, the entirety of the side surface 10d on the lens member 21-side of the light-conducting member 10 may be covered by the scattering member 30.

What is claimed is:

1. A contact-type image sensor module comprising:
    a light source;
    a light-conducting member that extends in a lengthwise direction and having an end face opposite the light source in the lengthwise direction, the light-conducting member including an irradiation surface for guiding light from the light source to an irradiated medium; and
    a lens member disposed along, and in contact with, the light-conducting member that forms an erect unmagnified image on a light-receiving surface of a linear image sensor;
    wherein a first angle is formed by the optical axes of the lens member and the light-conducting member, and a second angle is formed by the optical axis of the lens member and a segment of a light flux from an exit point on the irradiation surface to a point of incidence, and
    wherein the irradiation surface is oriented so as to increase the second angle relative to the first angle.

2. The contact-type image sensor module according to claim 1, further comprising:
    a scattering member:
    wherein the light-conducting member included a base surface facing the irradiation surface and side surface connecting the irradiation surface and the bottom face;
    wherein the side surface has a projecting portion; and
    wherein the scattering member is provided opposite the base surface and the side surface further toward the base surface than the projecting portion, the scattering member scattering light emitted from the base surface and the side surface.

3. An image reading device comprising:
    the contact-type image sensor module according to claim 2; and
    a positioning member that positions the document relative to the light source and the lens member.

4. The image reading device according to claim 3, further comprising:
    a light-transmissive placement member upon which a document is placed,
    wherein an angle formed between the placement member and the base surface is greater than an angle formed between the placement member and the irradiation surface.

5. The contact-type image sensor module according to claim 1,
    wherein the irradiation surface faces the optical axis of the lens member.

6. The contact-type image sensor module according to claim 5,
    wherein the irradiation surface refracts light emitted from the irradiation surface toward the optical axis of the lens member.

7. The contact-type image sensor module according to claim 5, wherein the irradiation surface faces the optical axis of the lens member.

8. The document illumination device according to claim 1, wherein the irradiation surface refracts light so that an angle formed between a line perpendicular to the irradiation surface and the light emitted from the irradiation surface is greater than an angle formed between the line perpendicular to the irradiation surface and light traveling toward the irradiation surface.

* * * * *